(12) United States Patent
Radermacher et al.

(10) Patent No.: US 11,184,182 B2
(45) Date of Patent: Nov. 23, 2021

(54) DEVICE AND METHOD FOR PARALLEL POWERING

(71) Applicant: SIGNIFY HOLDING B.V., Eindhoven (NL)

(72) Inventors: Harald Josef Günther Radermacher, Aachen (DE); Matthias Wendt, Würselen (DE); Dave Willem Van Goor, Neederweert Eind (NL); Lennart Yseboodt, Retie (BE)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/884,583

(22) Filed: May 27, 2020

(65) Prior Publication Data
US 2020/0287731 A1  Sep. 10, 2020

Related U.S. Application Data (62) Division of application No. 15/553,719, filed as application No. PCT/EP2016/053435 on Feb. 18, 2016, now Pat. No. 10,693,666.

(30) Foreign Application Priority Data

Feb. 27, 2015 (EP) ..................... 15156887

(51) Int. Cl.
*G06F 1/28* (2006.01)
*G06N 5/02* (2006.01)
*H04L 12/10* (2006.01)
*H04L 12/40* (2006.01)
*H05B 45/46* (2020.01)

(52) U.S. Cl.
CPC ........ *H04L 12/10* (2013.01); *H04L 12/40045* (2013.01); *H05B 45/46* (2020.01)

(58) Field of Classification Search
CPC .... H04L 12/10; H04L 12/40045; H05B 45/46
See application file for complete search history.

(56) References Cited

U.S. PATENT DOCUMENTS

| 2004/0108845 A1 | 6/2004 | Shieh et al. |
| 2007/0057728 A1* | 3/2007 | Autti .................. H03F 3/195 330/285 |
| 2008/0150718 A1 | 6/2008 | Apfel |

(Continued)

FOREIGN PATENT DOCUMENTS

RU          2534020 C1    11/2014

*Primary Examiner* — Jared Fureman
*Assistant Examiner* — Esayas G Yeshaw (57) ABSTRACT

The invention relates to powering one or more devices, in particular in the context of Power-over-Ethernet (PoE). In an embodiment of the invention, it is proposed to equip each node (11) with a PD interface (22) that can signal multiples of the standard defined unity load (25 kΩ with tolerances) during the detection process and increase the load during a sequence of detection attempts. In that way, several nodes (11) can share one PSE outlet and determine the number of neighboring loads (11). At the same time, each node (11) will offer full functionality during "normal" stand-alone wiring. This powering concept can be combined with full or limited data communication capabilities.

16 Claims, 5 Drawing Sheets

(56) References Cited

U.S. PATENT DOCUMENTS

| | | | |
|---|---|---|---|
| 2010/0217447 A1* | 8/2010 | Karam | H04L 12/10 |
| | | | 700/286 |
| 2011/0085584 A1 | 4/2011 | Wei et al. | |
| 2013/0076146 A1 | 3/2013 | Maniktala | |
| 2014/0152376 A1* | 6/2014 | Rofougaran | H01L 23/48 |
| | | | 327/530 |
| 2014/0184997 A1 | 7/2014 | Yan et al. | |
| 2014/0229747 A1 | 8/2014 | Jain et al. | |
| 2016/0164688 A1* | 6/2016 | Yseboodt | H05B 47/18 |
| | | | 307/1 |
| 2016/0172851 A1 | 6/2016 | Wendt | |

* cited by examiner

DEVICE AND METHOD FOR PARALLEL POWERING

FIELD OF THE INVENTION

The present invention is related to powering one or more devices, in particular in the context of Power-over-Ethernet (PoE). The invention is in particular related to PoE lighting systems.

BACKGROUND OF THE INVENTION

According to the original concept of Power-over-Ethernet (PoE, see, for example, IEEE 802.3 af/at standard), every PoE device or powered device (PD) (e.g. luminaires, sensors etc.) has its own connection to the power sourcing equipment (PSE), because the power is distributed in a star like cabling structure, potentially increasing the total cable length.

In many installations cabling loads in a chain would be interesting, such that a part of the cable is shared by several loads. The individual nodes in a chain may even leverage from information on the number of loads in this PSE segment, e.g. in order to prevent overloading the PSE.

Upcoming solutions with a low voltage DC distribution e.g. following the PoE standard are hampered as infrastructure changes need to be done before new lighting devices can be mounted. Other DC distribution systems as used in lighting not adhering a PoE standard commonly have the same high investment in infrastructural change and small installations do mostly not make any commercial sense.

Figure 1:
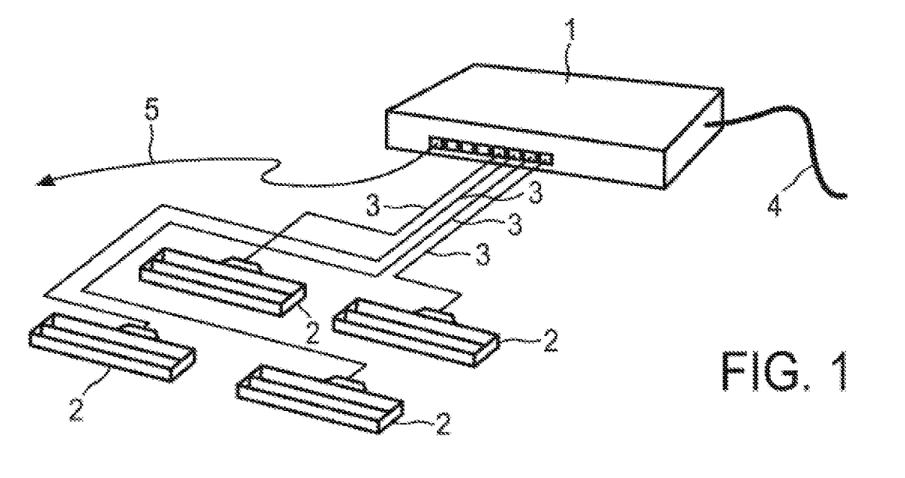
FIG. 1 shows a conventional PoE lighting system with a star like cabling.

A typical PoE lighting system is illustrated in FIG. 1 with a PSE 1 and a number of PDs 2 in the form of luminaires. Each luminaire 2 is connected by a dedicated cable 3 to the PSE 1, which is provided with a mains connection 4 and an Ethernet connection 5. A typical luminaire 2 for such system comprises LED modules generating light and an electronic section controlling the LED current as well as interfacing to the PoE connection for negotiation and voltage adaptation.

US 2010/0217447 A1 is related to a detection of multiple powered devices connected to an inline power delivery channel. It is disclosed to provide multiple PDs (number n) such they each provide a resistance of n·25 kΩ, so that the parallel combination equals the standard 25 kΩ and is correctly detectable by the PSE. US 2010/0217447 A1, however, does not disclose how the number of PDs is determined in the first place and how the resistance provided by the PD (i.e. the multiple of 25 kΩ) is set.

US 2011/0885584 A1 is related to a long-reach Ethernet system and relay. A case is discussed where a number of relays and an Ethernet terminal are connected in parallel to form a powered load. In order to decrease an influence of the relays on the PD in-position detection, the in-position indication resistance of the relays is made much larger than 26.5 kΩ (>265 kΩ, e.g. 470 kΩ), such that the parallel in-position indication equivalent resistances of the relays and the PD are basically the same as the PD in the first place. It may be said that, according to US 2011/0885584 A1, the relays are made "invisible" in the parallel connection for detection by the PSE. However, due to the change in the in-position indication, the relays may not be connected to the PSE alone (or would at least not be detected as potential PDs).

SUMMARY OF THE INVENTION

It is an object of the present invention to provide for a parallel connection or coupling for PDs to a common supply line, while the PDs on the one side may still properly comply with, for example, the PoE requirements even if connected alone and while further there is flexibility and ease of use in regard to the number of parallel PDs provided.

In a first aspect of the present invention a device allowing parallel powering is presented, comprising characteristic setting unit for setting a characteristic, wherein the characteristic is used for signaling the presence of a powered device and wherein the characteristic is to be detected by a power source equipment via a supply line for powering, a sensor coupled to the supply line, wherein the sensor is arranged for checking for an application of a detection voltage and/or detection current by the power source equipment to the supply line and for outputting a sensor signal, and a controller coupled to the characteristic setting unit and the sensor, wherein the controller is arranged, upon receipt of the sensor signal from the sensor indicating the application (of the detection voltage and/or detection current by the power source equipment to the supply line) in absence of a coupling with the power source equipment (i.e. the power source equipment providing operational power), for controlling the characteristic setting unit so to change the characteristic.

In a further aspect of the present invention, a method of parallel powering powered devices via a supply line is presented, comprising one or more repetitions of the steps of setting a characteristic used for signaling the presence of a powered device, wherein the characteristic is to be detected by a power source equipment via the supply line, checking for an application of a detection voltage and/or detection current by the power source equipment to the supply line, and causing a change of the setting of the characteristic in case the checking indicates the application of the detection voltage and/or detection current when the powered device is not coupled with the power source equipment.

It is to be noted that the term "powered device" is not to be understood as implying that the power provided to the powered device is also consumed partially or completely by the powered device, as the provided power may as well be forwarded to a different entity. In other words, in a situation where, for example, a conventional Power-over-Ethernet device is combined with a separate unit, the separate unit including the characteristic setting unit (in this case in the form of an interface, see below), the sensor and the controller as defined in claim 1, the separate unit alone is already to be considered as a "powered device", regardless of the power being consumed by the conventional device. Nevertheless, any combination of such separate unit and conventional device is still a "powered device", as long as the defined units are provided in either one of separate unit and device.

The invention is based on the following considerations, which will be explained while referring to Power-over-Ethernet as an example of a context for powering devices. In order to be recognizable according to the PoE standard, the combined load (i.e. the combination of powered devices provided in parallel on the supply line) has to present an impedance value (the characteristic to be presented in case of Power-over-Ethernet) as prescribed by the PoE-standard (in case of only considering resistance as value between 23.75 kΩ and 26.25 kΩ, typically 25 kΩ). If the impedance seen by the PSE does not fall into the prescribed range, the PSE will not continue to the classification and the provision of power, as the impedance check is performed as a safeguard against damaging devices not compliant with the PoE standard. In case no knowledge is (surely) provided on the side of the powered devices as to how many other powered devices are connected in parallel to the supply line (e.g. the Ethernet cable), a successful detection by the PSE may nevertheless be achieved in case the powered devices follow a consistent approach along the line of trial and error. If a resistance of 25 kΩ multiplied by the (unknown) number of parallel devices is presented by each of the device, the combined resistance (due to the parallel arrangement) becomes 25 kΩ. Thus, the present invention provides for a change in the impedance value in case an unsuccessful attempt for a detection of compliant devices is recognized. If all devices connected in parallel follow this approach, eventually the correct multiplier may be found. Preferably, the change is done in a predetermined and synchronized manner, so that the number of attempts until success may be kept low, even though a random change (within limits) or different sequences with changing offsets may be used.

In an advantageous embodiment, the device is a powered device (in the broadest sense as discussed above, even though this also applies to a powered device per se) arranged for being powered via the supply line and the characteristic setting unit is an interface for presenting the characteristic to the supply line in order to signal the presence of the powered device.

A powered device according to this embodiment differs from conventional powered devices (which are arranged only for presenting one single predetermined characteristic, e.g. a fixed resistance of 25 kΩ as discussed above) in particular in the possibility of presenting modifying characteristics, so that being taking into account the also modified characteristics presented by parallel powered device, the combined characteristic detected by the power source equipment allows for a successful coupling.

In a further advantageous embodiment, the device is a connecting unit arranged for coupling the power source equipment and at least one powered device and wherein the device includes at least a portion of the supply line.

In contrast to the above case, where the characteristic presented by the powered device to the supply line is changed, in this embodiment, the characteristic presented by the powered device(s) to be powered in parallel (which might as well be conventional powered devices) may remain unchanged, while the characteristic detected by the power source equipment is modified by the characteristic setting unit, e.g. by adding an additional characteristic. Let us assume, for simplicity, a case where two conventional powered device (each having an internal resistance of 25 kΩ) are to be connected in parallel to a single port of a power source equipment. In case such conventional powered device would be directly coupled to the single port, e.g. by using a Y-connector, the power source equipment would detect a combined resistance of 12.5 kΩ and would not provide power. (In the embodiment discussed above, powered devices may change their internal resistance by switching to 50 kΩ in order to achieve the combined resistance of 25 kΩ). In case of this embodiment, however, an additional resistance of 25 kOhm may be included in one of the lines of each cable forming the supply line, respectively. This additional resistance would thus be provided in series to the internal resistance of the conventional powered devices, raising the total resistance in the respective parallel branches also to 50 kΩ, such that the combined resistance of the two conventional powered device and the two devices for parallel powering would again be 25 kΩ. In other words, rather than switching between different resistances in the powered devices as in the embodiment above, the present embodiment provides for, for example, selectively adding further resistance to the resistance of the (conventional) powered device(s). Once the detection is successful, the resistance may be removed again, as it would otherwise consume power.

It is to be noted that the aspects of the present invention as discussed above with respect to the two embodiments may also be combined with each other, even though such combination would complicate the processing for finding the proper characteristic to be set/to be presented.

In a preferred embodiment, the controller and/or the characteristic setting unit are arranged for changing the characteristic according to a predetermined scheme.

The predetermined scheme shared by the provided devices allows for a systematic trying of the available range of the characteristic and if the scheme is followed by the devices without temporal offset, the correct value may be found within one course of the scheme (unless, for example, the number of (powered) devices exceeds a limit foreseen in the determination of the scheme).

It is to be noted that the predetermined scheme may allow for portions of the scheme which may be determined by the device itself (see below), so that each device has its own combination of self-determined scheme part and predefined scheme part forming the predetermined scheme.

In a modification of the preferred embodiment, the predetermined scheme is a predetermined sequence of characteristics.

The predetermined sequence of characteristics may be that, in particular in case of an embodiment of claim 2, just a multiplier for the value of standard characteristic (e.g. a resistance of 25 kΩ) is increased for each detected unsuccessful attempt of detection the powered devices, preferably until a maximum value is reached, e.g. 1, 2, 3, 4, . . . max. Nevertheless, the sequence may also follow an ordering based on other considerations, like 1, 5, 3, 7, 6, . . . . The sequence may furthermore include repetitions of multipliers (e.g. 1, 2, 3, 4, 2, 5, 6, 4, . . . ).

In the situation of an embodiment according to claim 3, the above sequences include also a multiplier of "0", in order to address the case that only a single (possibly conventional) powered device is connected via the device for parallel powering to the power source equipment.

Furthermore, in the situation of an embodiment according to claim 3, the sequence may also take into account that a device for allowing parallel powering may be provided separately for each powered device (e.g. in the form of a cable connecting the powered device to a Y-connector or the like, which, in turn, is plugged into a port of the power source equipment and may be provided for multiple powered devices together (e.g. such that a Y-connector or the like is provided by the device for allowing parallel powering (which might be plugged directly into a port of the power source equipment) and the multiple powered devices). Under the assumption, for example, that the devices allowing for parallel powering are by themselves only provided in parallel (and not in series), while the characteristic were the resistance (with a resistance of 25 kΩ being used for signaling the presence of a conventional powered device) a sequence may be provided by i·25 kΩ–25 kΩ/j, with i indicating the number of parallel branches and j indicating the number of powered devices in the same branch as the present device for allowing parallel powering.

Furthermore, it is not necessarily the case that the characteristic has to remain constant between the detection attempts and it may also be the case that the characteristic may be increased and/or decreased (quasi) continuous, so that the characteristic follows a continuous function of time (or even a continuously differentiable function).

It is also foreseen that the predetermined scheme may be formed in part by a (predetermined) sequence (i.e. a series of discrete values) and in part by a (quasi) continuous change of the characteristic value.

In a further modification of the preferred embodiment, the predetermined scheme includes at least one characteristic based on information on previous couplings between the powered device and the power source equipment.

As mentioned above, the scheme may include a portion or at least one value which would not be predefined by its value but only by its character. In case the device is or becomes aware of the number of (other powered) devices connected in parallel, the corresponding characteristic may be used after a disconnection or the like caused by the PSE and accordingly, and, if no change to the number of parallel powered devices occurred, following detection process will quickly be brought to a successful coupling. Another (possibly additional) option might be to use an average over a number of previous couplings. A further beneficial option (which might also be combined with the other options) includes using as a first characteristic a value corresponding to the previously detected or learned number of parallel devices (or the average over a number of previous couplings) followed by a second attempt (if necessary) using a characteristic corresponding to a number of devices reduced by one, further followed (if necessary) using a characteristic corresponding to a number of device increased by one. Using such option results, for example in the case of a broken or removed parallel device, in a successful detection upon the second try and, for example in the case of an added device, in a successful detection upon the third try (of course, the order may also be reversed or otherwise changed). A combination of these options might correspond to a situation dependent sequence of characteristic values corresponding to "previous number of devices", "average of devices over previous 'n' couplings", "previous number of devices−1", "previous number of devices+1", followed by a predefined sequence as discussed above. It is to be noted that the characteristic based on information on previous couplings needs not to be identical to a previously presented characteristic but may also be just derived from the information.

In a yet further modification of the preferred embodiment, the controller and/or the characteristic setting unit are arranged for resetting the predetermined scheme upon a predetermined amount of change of the presented characteristic and/or after lapse of a predetermined period of time.

If, for example, two devices follow the same sequence but are out of synchronization, it may well be that the correct combined characteristic is newer achieved. Thus, based on a length of a sequence, a number of repetitions of such sequence or scheme, or on a duration of the process, the scheme may be restarted, preferably in such a manner that the resetting or restarting brings the connected device into synchronization.

In another modification of the preferred embodiment, the device is arranged for outputting a reset signal for causing devices connected in parallel to the supply line to reset the predetermined scheme, and/or the controller and/or the characteristic setting unit are arranged for resetting the predetermined scheme upon receipt of a reset signal.

In case any one of the devices connected to the supply line has found that the current attempt of connecting the powered device(s) to the power source equipment might not succeed at all or for any other reason, the signal may be issued causing the compliant devices to restart their processing, so that the connected devices may be become synchronized.

In another preferred embodiment the controller is arranged for controlling the characteristic setting unit to change the characteristic to a predetermined characteristic for indicating a particular situation.

Such situation may include the detection of an error (like wrong wiring or the presence of non-PoE loads (in case of powering according to PoE) on the supply line), where the characteristic may be changed to a value consistently preventing a detection of a combined load of the detection characteristic. For example, in the case of powered devices by themselves arranged for being powered parallel (see above), the resistance may be changed to a very low value (including an electrical short), so that at least the PSE may be made aware of such error.

Additionally, the characteristic may be changed to reflect an unconnected state (e.g. substantially infinite resistance), so this powered device would no longer influence the detection and connection process of other similar powered devices connected to the supply line.

In case the characteristic is set, for example, by including a (further) impedance into the supply line, such impedance may be provided so high that at also no coupling may occur.

In a further preferred embodiment, the controller is arranged, upon coupling with the power source equipment, for determining a number of powered devices connected in parallel to the supply line from the set characteristic.

The knowledge about the total number of powered devices connected in parallel may be derived from the set characteristic in the case of a successful coupling by comparison to the detection characteristic prescribed by, for example, the PoE standard and used for, for example, the negotiation process for powered to be consumed by the powered device. Alternatively or additionally, the determined total number may be made available to a different entity (including the case that the number is indicated to the user, e.g. in a display or by other means).

In a yet further preferred embodiment, the powered device comprises a first connector for an incoming portion of the supply line and a second connector for an outgoing portion of the supply line.

A chain arrangement may conveniently achieved by providing an incoming and an outgoing connection so no additional equipment would be needed.

Nevertheless, the parallel connection may also be implemented by using additional parallel connectors branching, for example, an Ethernet cable, into one branch for the next powered device and one branch for the further devices downstream.

In a preferred embodiment of the present invention, the powered device is arranged to be powered by Power-over-Ethernet, wherein furthermore the characteristic is an impedance.

Power-over-Ethernet is a widespread standard for providing power and as the characteristic for determining compliance with PoE impedance (and specifically resistance) is commonly used.

In a further embodiment of the present invention, after initial couplings between multiple powered devices and the power source equipment, the initial couplings are cancelled and repetitions of the steps of the method as defined in claim 12 are provided in parallel, so final couplings are achieved together.

Under the assumption, in the context of Power-over-Ethernet and the characteristic being specifically the resistance, of a simple sequence like 1, 2, 3, 4 and three devices on the supply line, a case may happen in which the third device is connected later and there is an offset between the sequences by two detections. The first two devices might show a resistance of 100 kΩ each, the third one of 50 kΩ, resulting in the combined value of 25 kn. The detection would then be successful, even though the PDs and the PSE might assume a wrong number of connected devices based on the respective sequences. In case the presumably detected or determined number of parallel devices is of no further consequence, the above described "hot-plugging" situation is of no concern. If, however, there is a desire for deriving also—without additional communication or the like—the number of devices connected in parallel to the supply line, after a successful coupling, such coupling may be cancelled and all device involved will reset and restart their changing of the characteristic in a synchronized manner, then allowing for a determination based on, for example, the course of the used sequence.

In another aspect of the present invention a power source equipment arranged for being coupled to one or more devices for allowing parallel powering according to the invention via a supply line is presented, comprising a counting unit for counting a number of unsuccessful attempts for coupling between the power source equipment and one or more powered devices, and a determination unit for determining a number of powered devices connected in parallel to the supply line and coupled to the power source equipment, in case of successful coupling between the power source equipment and the one or more powered devices, based on the counted number, wherein the power source equipment is arranged for taking into account the determined number in providing power to the one or more powered devices.

In a further aspect of the present invention a computer program or software product is presented for controlling a device for allowing parallel powering, the software product comprising program code means for causing the powered device according to the invention to carry out the steps of the method according to the invention when the software product is run on the powered device.

In a yet further aspect of the present invention a computer program or software product is presented for controlling the provision of power from a power source equipment to one or more powered devices via a supply line, the software product comprising code means for causing a power source equipment to carry out the steps of counting a number of unsuccessful attempts for coupling between the power source equipment and the one or more powered devices, determining a number of powered devices connected in parallel to the supply line and coupled to the power source equipment, in case of successful coupling between the power source equipment and the one or more powered devices, based on the counted number, and taking into account the determined number in providing power to the one or more powered devices, when the software product is run on the power source equipment.

It shall be understood that the powered device of claim 1, the power source equipment of claim 11, the method of claim 12, and the computer programs of claims 14 and 15 have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 2:
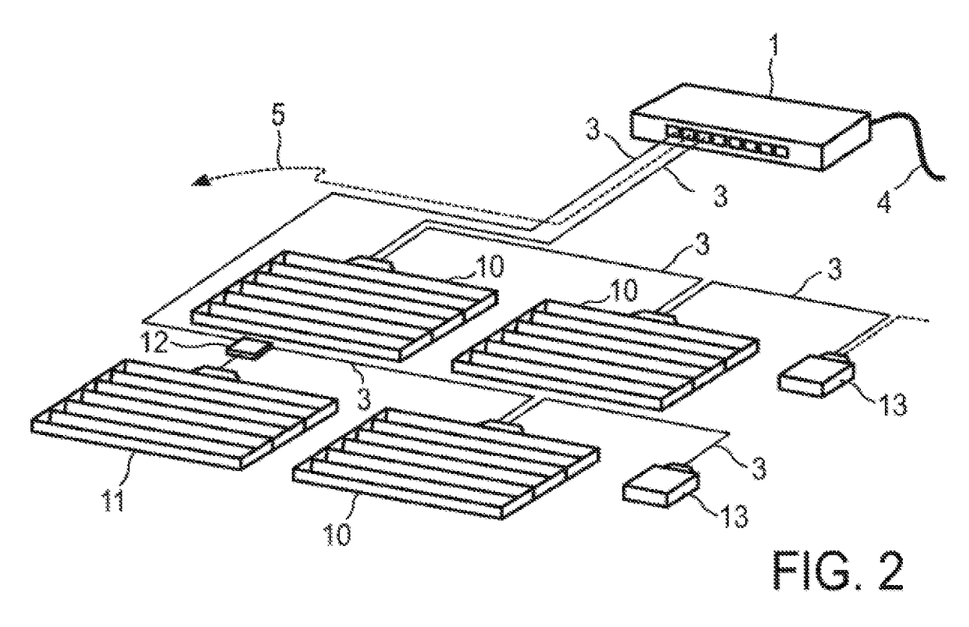
FIG. 2 shows a PoE lighting system including embodiments of the invention.

FIG. 2 shows a PoE lighting system including embodiments of the invention.

The Power-over-Ethernet lighting system shown in FIG. 2 includes, similar to the conventional PoE lighting system shown in FIG. 1, a power source equipment (PSE) 1 provided with a mains connection 4 (even though other means for powering the PSE may be used as well) and an Ethernet connection 5 (which is optional). The present invention allows for using a conventional PSE with the powered device(s) according to the present invention.

In contrast to the situation shown in FIG. 1, the powered devices (PD) 10, 11 are not connected to the PSE 1 in a star-like way (i.e. each PD connected by a dedicated line 3 to the PSE 1), but in two chains, using Ethernet cables 3 each. One set of PDs 11 is connected by means of a parallel connector 12, which branches the supply line. Further, the other set of PDs 10 is connected such that each PD 10 includes two sockets where the supply line is continued at the other socket.

In addition, in FIG. 2 also light sensors 13 are also connected, while these sensors 13 work in the usual manner.

As it can be seen from FIG. 2, in particular in comparison to FIG. 1, the required cable connections allow building chains where e.g. the sensors get wired to a chain with the related luminaires. The number of loads per PSE output information can be used for the selection of suitable power levels.

Figure 3:
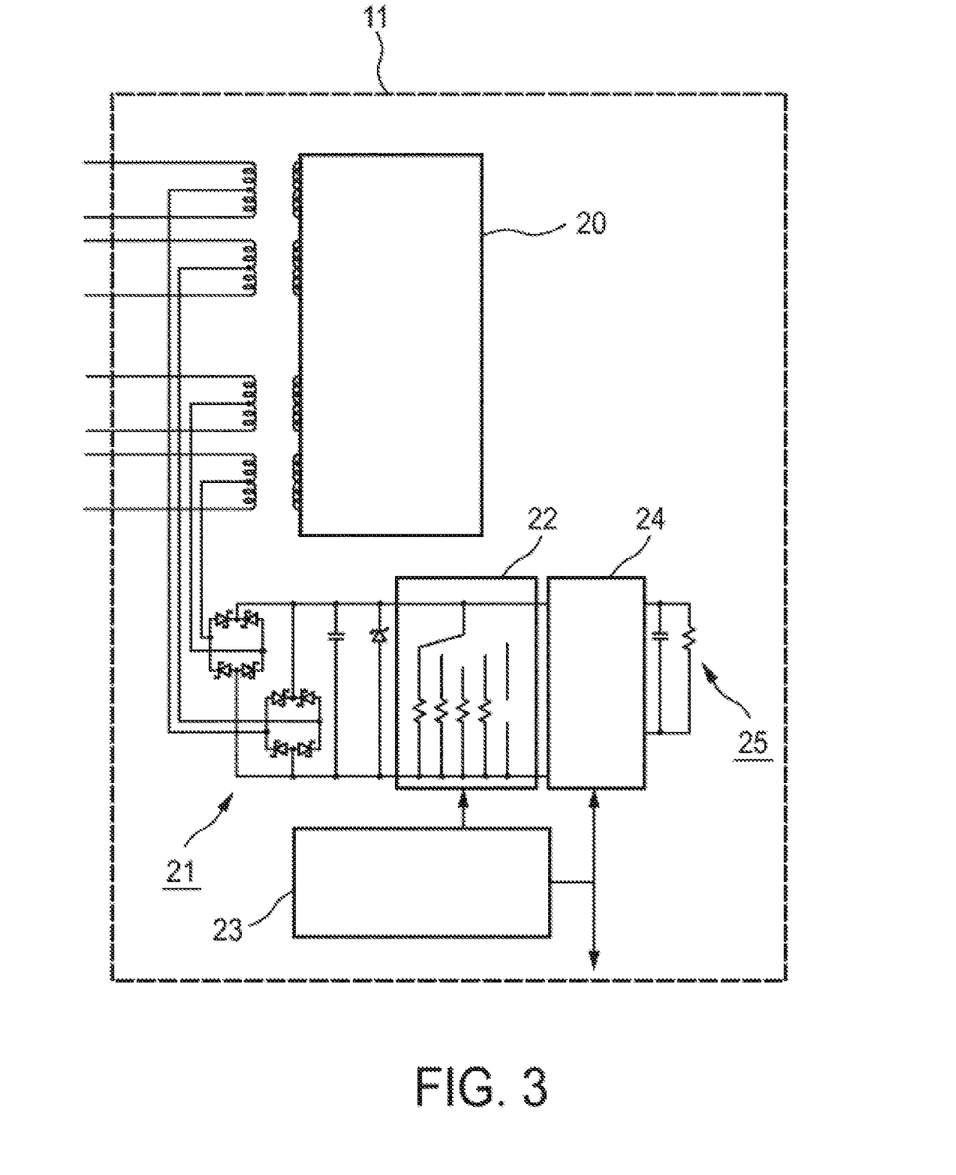
FIG. 3 shows a powered device in accordance with an embodiment of the invention.

FIG. 3 shows a powered device in accordance with an embodiment of the invention.

The powered device (PD) shown in FIG. 3 comprises a first PoE port (incoming supply line), a data transceiver 20, a rectification unit 21, a control unit including resistance signaling means 22 (i.e. a circuitry for selectively presenting a resistance to a detection by the PSE as an example for an interface for presenting impedance) for signaling resistances to the PSE and a controller 23 including circuitry for controlling the resistance signaling means 22 for signaling resistances to the PSE (also functioning as sensor for recognizing detection attempts by a PSE), a PoE-controller 25, handling the classification and the power flow towards the load and the load for consuming power (e.g. a light source, a sensor, a data gateway, a user interface, . . . ).

The data transceiver 20 is inductively coupled to the wires of the internal lines connected to the supply line, which are provided to the rectification unit 21. Beyond the rectification unit 21 the circuitry of the resistance signaling means 22 is provided, which is coupled to the controller 23. The PoE-controller is provided between the lines and the load 25.

The resistance signaling means is just an example of a setup designed for presenting desired impedance. In particular, the invention is not limited to the shown "R-stepping unit" and any functionality does not have to be based on switches and resistors. Other means, if the impedance is changed by adjusting the resistance, such as a controlled current sink can be used, too.

The data transceiver 20 is optional to the invention and only needed in case full data communication is desired.

The rectification unit 21 is optional to the invention, in case full flexibility on the input polarity is needed. When using the invention in a system with defined polarity and/or used pairs, a simpler or even no rectification unit can be sufficient, too.

The PoE-controller 24 is optional to the invention. Classification can also be handled, for example, by further set points in the resistance signaling means 22, while power flow can also be controlled by the load 25 itself.

It is to be noted that the load 25 does not necessarily have to be internal to the powered device 11, as the powered device according to the present invention may also provide power to a different entity.

Figure 4:
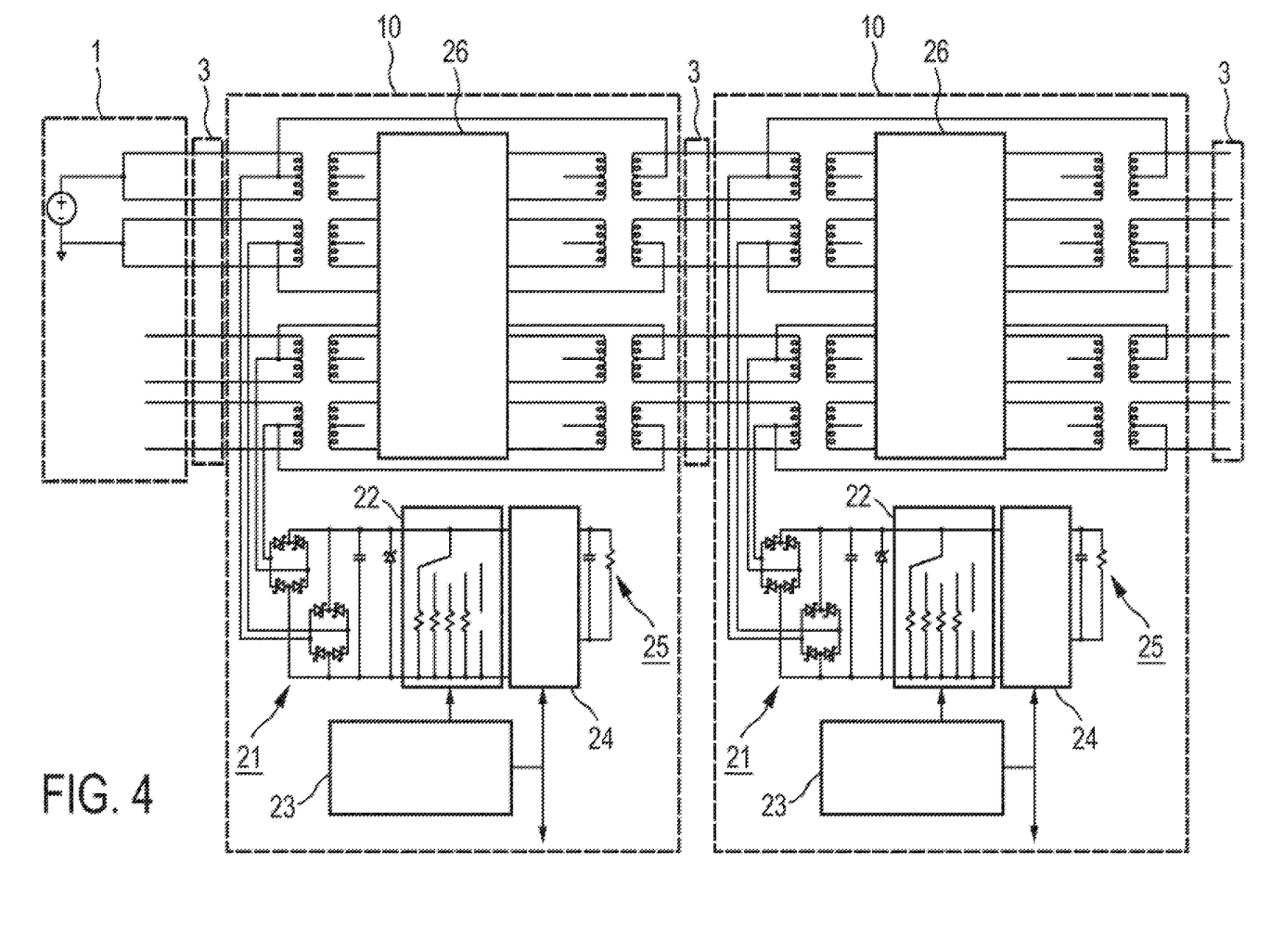
FIG. 4 shows powered devices in accordance with another embodiment of the invention.

FIG. 4 shows powered devices in accordance with another embodiment of the invention.

Two powered devices (PD) 10, connected to the PSE (not shown) are shown in FIG. 4. These PDs 10 differs from the first embodiment shown in FIG. 3 in that they have two ports, enabling to daisy chain them without special cabling.

Each PD 10 comprises, a first PoE port, a second PoE port, circuitry for forwarding power from the first to the second port, a T-Switch 26 or data hub for data communication, a rectification unit 21, a control unit including resistance signaling means 22 (i.e. a circuitry for selectively presenting a resistance to a detection by the PSE) for signaling resistances to the PSE and a controller 23 including circuitry for controlling the resistance signaling means 22 for signaling resistances to the PSE (just as in the embodiment of FIG. 3), a PoE-controller 25, handling the classification and the power flow towards the load and the load for consuming power.

The key difference between the powered device 10 of the present embodiment in comparison to that of the embodiment shown in FIG. 3 is that the PD 10 has a second port such that other powered devices can directly be connected to the PD 10. This is especially useful for connection of an extension module (for increasing the light output or functionality) to the first PD in the line.

The comments provided above with respect to the rectification unit 21, the PoE-controller 24 and the load 25 apply also here. Similar to the data transceiver, the T switch or data hub 26 is optional, for the case full data communication is needed.

Figure 5:
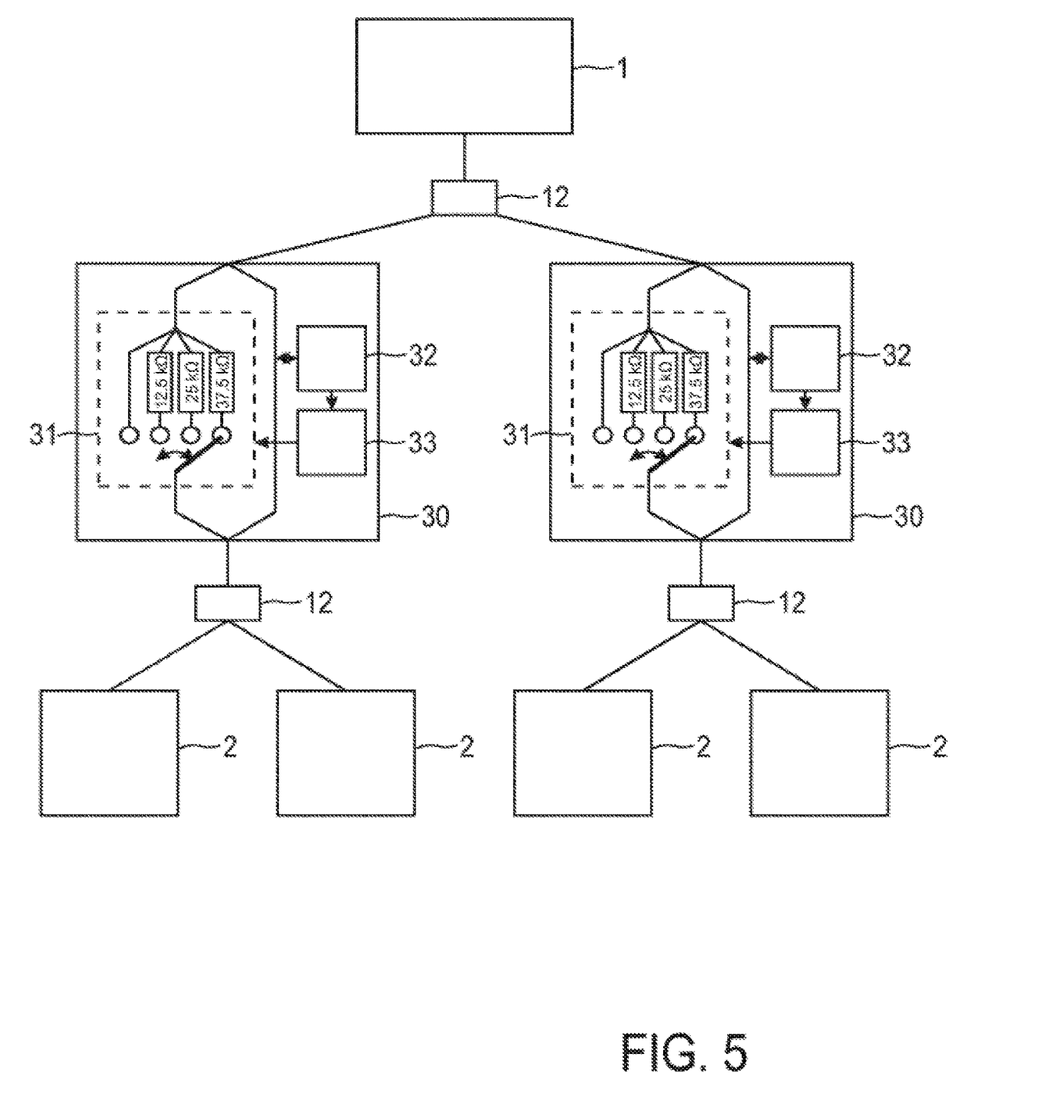
FIG. 5 shows an arrangement including a power source equipment, multiple conventional PoE powered devices and multiple devices for allowing parallel powering according to a further embodiment of the invention

FIG. 5 shows an arrangement including a power source equipment, multiple conventional PoE powered devices and multiple devices for allowing parallel powering according to a further embodiment of the invention.

As shown in FIG. 5, two devices 30 for allowing parallel powering are coupled via a T-Branch 12 to the same port of a power source equipment 1. Two conventional powered devices 2 are coupled to one of the two devices 30, while two further conventional powered devices 2 are coupled to the other one of the two devices 30.

The conventional powered devices 2 have an internal resistance of 25 k$\Omega$ in accordance with the Power-over-Ethernet standard and the power source equipment 1 checks for such resistance to be connected to its ports, also in accordance with PoE.

The devices 30 are, in this exemplary embodiment, provided for connecting in total up to 4 powered devices 2 in parallel to the port of the power source equipment and accordingly the characteristic setting unit 31 has four different settings, corresponding to the cases that either one or two branches (devices for parallel powering) are provided in parallel and the cases that one or two powered devices are connected to the device for parallel powering. In accordance with the formula i·25 k$\Omega$–25 k$\Omega$/j discussed above, the respective resistance values are 0$\Omega$, 12.5 k$\Omega$, 25 k$\Omega$ and 37.5 k$\Omega$, wherein these resistances are provided by the characteristic setting unit 31 in one of the wires of the supply line.

The devices 30 each are provided with a sensor 32 and a controller 33, wherein the sensor 32 is arranged for alerting the controller 33 about an application of a detection voltage and/or a detection current by the power source equipment 1. In case the detection is unsuccessful, the controller 33 instructs the characteristic setting unit 31 to change to the next characteristic, wherein these steps are repeating until eventually the detection is successful. In the illustrated case, the power source equipment 1 detects a combined resistance of 25 k$\Omega$ in case the characteristic setting units 31 each provide a resistance of 37.5 k$\Omega$ in addition to the resistance already provided by the powered devices.

It is to be noted that the invention is not limited to cases where the number of powered devices coupled to different devices for allowing parallel powering is the same, even such cases have the benefit that all devices for allowing parallel powering may use the same sequence and will eventually arrive at a common proper setting for the characteristic value.

Figure 6:
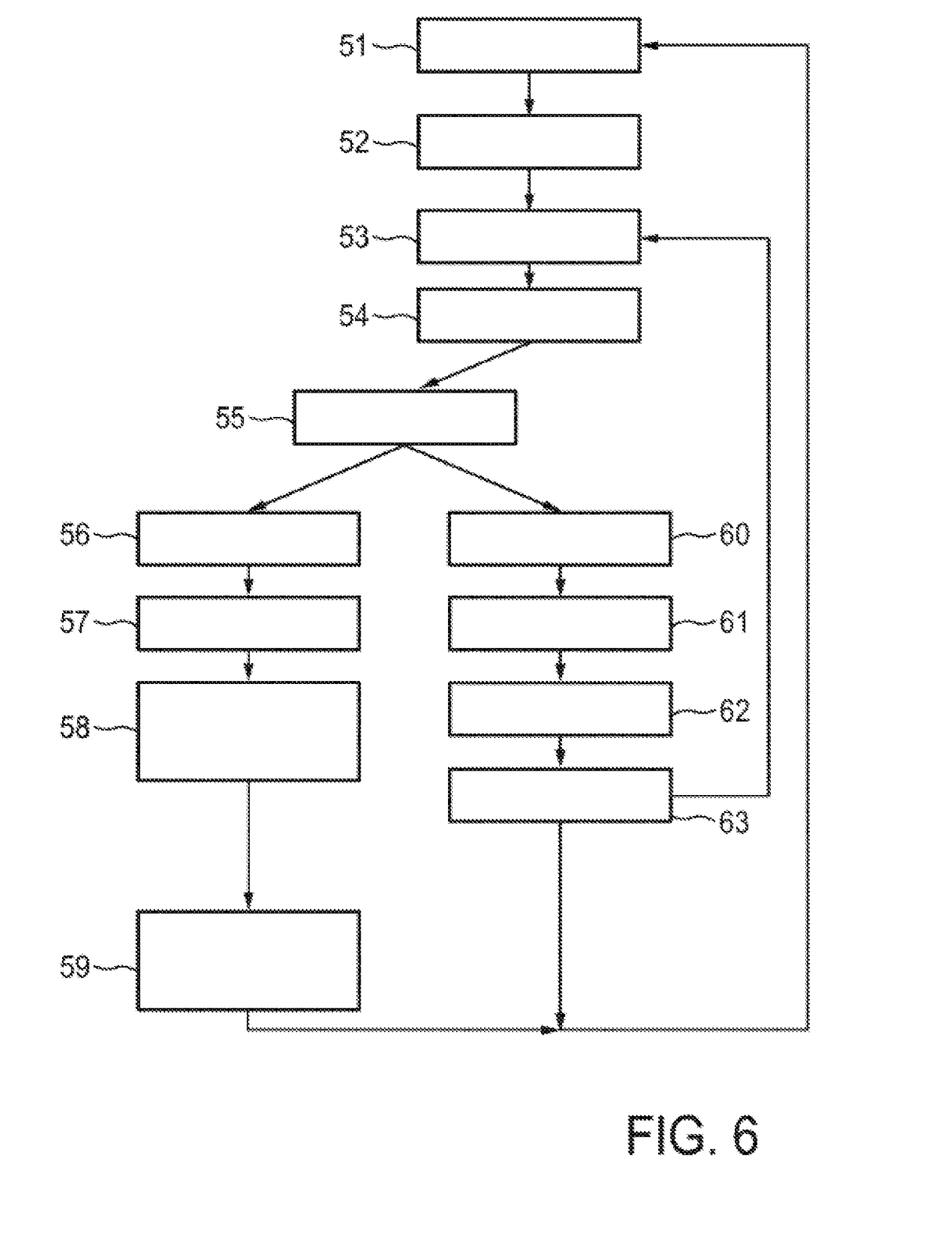
FIG. 6 shows a flow chart illustrating a method of controlling a powered device in accordance with an embodiment of the invention.

FIG. 6 shows a flow chart illustrating a method of controlling a powered device in accordance with an embodiment of the invention.

During detection, a certain voltage is applied by the PSE between some pairs of the Ethernet cable. A suitable load (being capable and designed for receiving power via the Ethernet port) can load this voltage with a resistance of 25 k$\Omega$. The PSE detects this load and continues with the classification and powering sequence. If a resistance significantly different from 25 k$\Omega$ is detected, the PSE assumes a load not compatible with PoE on that port, does not continue with the classification and powering sequence and may poll again after some time. This procedure is designed such that loads not compatible with PoE are not exposed to harmful voltages and that a PoE-compatible load is detected, even if they are connected to the PSE during operation (hot plug).

The following discussion focuses on multiples of a standard resistance of 25 k$\Omega$ as examples of the changed impedance, wherein it is to be understood that the tolerances provided by the standard also apply here.

The process illustrated in FIG. 6 starts with the powered device (see above) in an off or standby state (starting step 51). After "waking up", first the multiplier n is first reset (resetting step 52). The PSE starts a detection of connected powered device in detection step 53, so that the powered device receives the detection voltage (reception step 54). The controller of the powered device with set (or change) the interface for presenting impedance (or resistance in this case) to a value of the standard value (basically 25 k$\Omega$) multiplied by the multiplier n.

Typically, the first value of n to be set (i.e. the initial value) will be "1", so that the powered device initially appears like a conventional powered device with a resistance of 25 k$\Omega$ (presentation step 55).

If the presented resulting or combined resistance is correct, the PSE continues with the classification (continuation step 56) and either further set point on the interface or the features of the PoE-controller can be used for classification. After that, the PSE will, after the classification and negotiation procedure (classification and negotiation step 58) supply the full voltage (up to 56 V) to the PD, which can be forwarded to the load in operation step 59, eventually leading back to the starting step 51 (e.g. after power down).

At some point after the classification, the powered device may confirm from the setting of "n" the number of parallel devices connected to the supply line (confirmation step 57), which information may be used for power negotiation.

In the case where the PD is the only PD connected to that channel of the PSE, the process as viewed from the PSE corresponds to the conventional situation and in such case to the outside the special features of the invention appear not to be utilized.

In case the presented resulting or combined resistance is found not to be correct by the PSE, the process follows a different branch of the flow chart.

Assuming the situation of two powered device connected in parallel, in the presentation step 55, again each PD may signal simply 25 k$\Omega$ (n=1) to the PSE. Having these two resistances in parallel, the total resistance will be 12.5 k$\Omega$, which differs significantly from the expected value; hence the PSE will terminate this cycle and try again later (termination step 60). In the following recognition step 61, the powered devices notice the fact that an (first) unsuccessful detection cycle has happened (at a resistor setting of, in this case, 25 k$\Omega$) and store this. Thereafter, in changing step 62, the multiplier n is changed to a new value (not necessarily just incremented by 1), followed by a handling step 62 for handling possible timeouts, errors or reset situations, after which the process returns to the detection step 53 (by the PSE).

Upon the next detection cycle, both PDs do each apply a resistance of 50 k$\Omega$ to the input port. With two PDs in parallel, this will result in a total of 25 k$\Omega$, signaling a suitable load to the PSE, which will then continue with the classification procedure (step 56).

In case three PDs are connected in parallel, also the second cycle will not result in 25 k$\Omega$, hence it will be terminated (following the line of steps 60, 61, 62, 53), the information is again stored in the PD, which will then switch to the next multiplier value and will represent 3*25 k$\Omega$=75 k$\Omega$ each during the third detection process.

The process of applying a first multiple of 25 k$\Omega$, a detecting an unsuccessful detection cycle, changing the multiple and applying the second multiple of 25 k$\Omega$ will be repeated until a maximum multiple (corresponding to the maximum number of allowed PDs in parallel) has been applied. If this is reached, the PD will reset the sequence, switch to another sequence, initiate a pause time, or take similar actions.

Once a PD has detected or been informed about non-PoE-compatible loads on the same bus, it can signal this to the PSE, e.g. by choosing a low resistance value during the next detection cycle, such that the 25 k$\Omega$ cannot be reached, regardless of the setting in any of the parallel PDs on the same bus.

In case to end the power delivery directly, the PD can overload the PSE, forcing a disconnect and apply the low resistance during the next and any following detection cycles, until the erroneous situation has been resolved.

A problem that can occur is that of multiple PDs being unsynchronized. This can happen if part of the daisy chain is plugged in during the detection phase of PDs that are already plugged in. Unless addressed, such situation may cause the PDs never to reach a combined 25 k$\Omega$ detection signature.

A solution to this is the following:

A maximum number of detection tries is defined (or a maximum time period).

If a PD reaches this maximum it will connect a low impedance over the PoE lines.

Other PDs may notice that the detection mechanism stops for a certain amount of time and reset their state machine.

The PD that first reached the maximum will disconnect the low impedance and also reset its own state machine.

Detection procedure resumes and now all connected devices are in the same reset state and hence will proceed to detect successfully after a respective number of attempts.

The information on the steps (or multiplier) may also be an indicator for the number of devices in parallel on the bus. If, for example, the multiplier is just incremented by 1 for each try and the third detection cycle is successful, each of the PDs knows that there are two other similar PDs in parallel. This is very valuable information and can be used for limiting the own power consumption, because all three loads will have to share the total power budget of the PSE on that channel.

The information on the number of devices in parallel during classification can be captured and used by the PD, e.g. during the classification procedure, where a lamp may signal its own power class in way, that other, parallel PDs can also signal their own power class.

Just like the PD, also the PSE can track (count) the unsuccessful detection tries and capture the same information, too. This information can be forwarded to a lighting management system, but also used internally, e.g. to account for a higher power budget at that port, or to apply different (no) error detection limits for the data communication on that channel The PD according to the invention may be able to measure the impedance presented by other devices on the supply line, e.g. by monitoring the voltage/current at both PoE ports and directly jump to the impedance which will be needed. In case decoupling elements are present, this will allow every PD to understand its position in the chain and this may further shorten the identification time.

The powered device of the present invention may itself be rather an active parallel connector, a chain interface device shielding a connected legacy PD from the negotiation cycles and handle these by itself until power gets granted and then present the available power to the attached legacy PoE device which is not aware of the paralleling mechanism described herein.

In an embodiment of the invention, it is proposed to equip each node with a PD interface that can signal multiples of the standard defined unity load (25 k$\Omega$ with tolerances) during the detection process and increase the load during a sequence of detection attempts. In that way, several nodes can share one PSE outlet and determine the number of neighboring loads. At the same time, each node will offer full functionality during "normal" stand-alone wiring. This powering concept can be combined with full or limited data communication capabilities.

In other words, the invention, in a preferred embodiment, foresees equipping a node with a Powered Device (PD) controller that is capable of providing the correct impedance during detection towards the PSE, even if other loads are connected in parallel to the same output of a PSE.

From wiring point of view, each node may have two Ethernet sockets. One socket is acting as the input port and one as the output port, where it is also possible to reverse the assignment of input and output. Alternatively (i.e. for nodes which are only to be powered via PoE, but not data communication via the normal Ethernet protocol is required), the functionality of delivering one PSE output to multiple PD inputs can be solved by a special cabling or wiring method. Unlike classical splitters or Y-cables, which are normally used to split the 4 pairs of one Ethernet port to two time 2 pairs, simple parallel connection of the two output port towards one input port can be performed, hence this could be seen as an Passive Parallel Connector (PPC, no T-Switch for data) or an Active Parallel Connector (APC, with T-Switch for data). Further alternatively, special distribution means can be used, where the passive power forwarding and the T-Switch for data is realized outside the PD. An example of such arrangement may be a particular Y-cable together with additional equipment which handles the features related to interface, sensor and controller and forwards the data (if needed) and power to a powered device connected downstream (which may even be a conventional powered device, if the additional equipment "isolates" the conventional powered device from the detection by the PSE. A particular benefit of the invention lies in that the inventive circuitry takes care for obeying the negotiation rules employed for PoE and at the same time captures information on the number of loads connected to that PSE outlet.

One aspect of the present invention foresees a PD interface that is capable of signaling multiples of the PoE unity load (25 k$\Omega$) during a detection process, including an infinite resistance state. It may be provided that the multiple is increased (1, 2, 3, 4, and so on) during each detection attempt, while any other sequence (e.g. 1, 5, 3, 7, 6, . . . ) can be used, too. Also, a (quasi-) continuous increase or decrease can be applied as well. It is to be noted that tolerances (+/−x %) can be applied to the nominal value of 25 k$\Omega$, in particular as also PoE allows for such tolerances. The use of multiples of the unity load may be limited while additionally also a no-load state may be provided (with infinite resistance).

In preferred examples of the invention one or more of the following is provided: information on the currently assigned multiplier value is captured, the sequence is restarted after detection of a reset condition, a reset condition is signaled in a way, which is detectable to the other loads on the shared PSE output, an error (e.g. wrong wiring, presence of NON-PoE-Loads) is detected, the error is signaled to the PSE To some extent, features discussed in the present application may also be realized in the passive or active parallel connector PPC or APC, rather than in the powered device. As an example, the error detection and handling of non-compatible loads may be realized there. For example, the impedance of the PD might be changed inside the PD, while the detection of non-compliant loads and error handling is done externally, e.g. in the PPC and APC.

In its broadest terms, the powered device according to the present invention may be defined as a PoE powered device with adjustable behavior during detection. Preferably, the behavior depends on the detection history. Further, is may be the case that the detection resistance can be changed, in particular as the resistance is increased according to a predefined sequence. Indeed, the detection cycles until identification may be counted to yield the number of parallel PDs.

It is also foreseen that a PSE records identification impedances when not successfully identifying PDs in order detecting the application of the present invention and count the number of PDs.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single processor, device or other unit may fulfill the functions of several items recited in the claims. The mere fact that certain measures are recited in mutually different dependent claims does not indicate that a combination of these measures cannot be used to advantage.

Operations like checking for the presence of the detection voltage or detection current, and the control of the presented impedance can be implemented as program code means of a computer program and/or as dedicated hardware.

A computer program may be stored and/or distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A non-transitory computer readable medium for controlling a device for allowing parallel powering multiple powered devices via a supply line, comprising program code means for causing one or more processors to perform a method comprising one or more repetitions of the steps of:
setting an impedance as a characteristic used for signaling the presence of a compliant powered device arranged to be powered by Power-over-Ethernet, wherein the characteristic is to be detected by a power source equipment via the supply line,
checking for an application of a detection voltage and/or detection current by the power source equipment to the supply line and for outputting a sensor signal when an unsuccessful attempt for detection of a compliant device is recognized, and
causing a change of the setting of the characteristic in case the sensor signal is received;
wherein the device is a powered device arranged for being powered via the supply line and the device includes an interface for presenting the characteristic to the supply line in order to signal the presence of the powered device; or
wherein the device is a connecting unit arranged for coupling the power source equipment and at least one powered device; and
wherein the device includes at least a portion of the supply line.

2. The non-transitory computer readable medium of claim 1 comprising program code means for causing one or more processors to change the characteristic according to a predetermined scheme.

3. The non-transitory computer readable medium of device of claim 2, wherein the predetermined scheme is a predetermined sequence of characteristics.

4. The non-transitory computer readable medium of device of claim 2, wherein the predetermined scheme includes at least one characteristic based on information on previous couplings between the powered device and the power source equipment.

5. The non-transitory computer readable medium of device of claim 2 comprising program code means for causing one or more processors to reset the predetermined scheme upon a predetermined amount of change of the presented characteristic and/or after lapse of a predetermined period of time.

6. The non-transitory computer readable medium of device of claim 2 comprising program code means for causing one or more processors to output a reset signal for causing devices connected to the supply line to reset the predetermined scheme, and/or reset the predetermined scheme upon receipt of a reset signal.

7. The non-transitory computer readable medium of device of claim 1, wherein the device further comprises a first connector for an incoming portion of the supply line and a second connector for an outgoing portion of the supply line.

8. The non-transitory computer readable medium of device of claim 1, wherein, after initial couplings between multiple powered devices and the power source equipment, the initial couplings are cancelled and repetitions are provided in parallel, so final couplings are achieved together.

9. A non-transitory computer readable medium for controlling the provision of power from a power source equipment to one or more powered devices via a supply line, the non-transitory computer readable medium comprising code means for causing a power source equipment to carry out the steps of:
 counting a number of unsuccessful attempts for coupling between the power source equipment and the one or more powered devices;
 determining a number of powered devices connected in parallel to the supply line and coupled to the power source equipment, in case of successful coupling between the power source equipment and the one or more powered devices, based on the counted number; and
 taking into account the determined number in providing power to the one or more powered devices;
 wherein the non-transitory computer readable medium is run on the power source equipment;
 wherein the one or more powered devices include a device arranged for being powered via the supply line and the device includes an interface for presenting the characteristic to the supply line in order to signal the presence of the powered device; or
 wherein the device is a connecting unit arranged for coupling the power source equipment and at least one powered device; and
 wherein the device includes at least a portion of the supply line.

10. The non-transitory computer readable medium of claim 9 comprising program code means for causing one or more processors to change the characteristic according to a predetermined scheme.

11. The non-transitory computer readable medium of device of claim 10, wherein the predetermined scheme is a predetermined sequence of characteristics.

12. The non-transitory computer readable medium of device of claim 10, wherein the predetermined scheme includes at least one characteristic based on information on previous couplings between the powered device and the power source equipment.

13. The non-transitory computer readable medium of device of claim 10 comprising program code means for causing one or more processors to reset the predetermined scheme upon a predetermined amount of change of the presented characteristic and/or after lapse of a predetermined period of time.

14. The non-transitory computer readable medium of device of claim 10 comprising program code means for causing one or more processors to output a reset signal for causing devices connected to the supply line to reset the predetermined scheme, and/or reset the predetermined scheme upon receipt of a reset signal.

15. The non-transitory computer readable medium of device of claim 9, wherein the device further comprises a first connector for an incoming portion of the supply line and a second connector for an outgoing portion of the supply line.

16. The non-transitory computer readable medium of device of claim 9, wherein, after initial couplings between multiple powered devices and the power source equipment, the initial couplings are cancelled and repetitions are provided in parallel, so final couplings are achieved together.

\* \* \* \* \*